United States Patent [19]

Crawford

[11] 4,340,446

[45] Jul. 20, 1982

[54] HEAT RECOVERY IN DISTILLATION PROCESS

[76] Inventor: Lynn A. Crawford, Box 225 Suburban Rte., Rapid City, S. Dak. 57701

[21] Appl. No.: 192,316

[22] Filed: Sep. 30, 1980

Related U.S. Application Data

[63] Continuation of Ser. No. 71,687, Aug. 31, 1979, abandoned.

[51] Int. Cl.$^3$ ............................................. B01D 3/14
[52] U.S. Cl. ........................................ 203/19; 203/24; 203/26; 203/DIG. 13
[58] Field of Search ...................... 203/19, 21, 24, 26, 203/DIG. 8, DIG. 13, 91, 93, 94; 159/24 B, 46, DIG. 16; 568/913

[56] References Cited

U.S. PATENT DOCUMENTS

| | | | |
|---|---|---|---|
| 2,280,093 | 4/1942 | Kleinschmidt | 203/26 |
| 3,230,155 | 1/1966 | Schürch | 62/28 |
| 3,416,324 | 12/1968 | Swearingen | 62/26 |
| 3,445,345 | 5/1969 | Katzen et al. | 203/25 |

Primary Examiner—Frank Sever
Attorney, Agent, or Firm—Harvey B. Jacobson

[57] ABSTRACT

A distillation process for recovering concentrated ethanol from an aqueous fermentate comprises fractionation of components of the aqueous fermentate under reduced pressure with vapor recompression and recovery of waste heat in a manner which obviates the need for substantial external sources of heat to operate the fractionation apparatus. The process includes a preliminary enrichment of the fermentate to separate volatile components, the enrichment also including recompression of a vapor phase and utilization of waste heat. The compression means used during enrichment and fractionation are run by engines which produce the recoverable waste heat. The utilization of vapor recompression and the use of waste heat to dry solid matter separated during the enrichment of the fermentate, for preheating the fermentate and for heating other process streams provides an energy efficient manner in which to recover ethanol from a fermentate.

14 Claims, 2 Drawing Figures

HEAT RECOVERY IN DISTILLATION PROCESS

This is a continuation of application Ser. No. 71,687, filed Aug. 31, 1979, now abandoned.

BACKGROUND OF THE INVENTION

1. Field of the Invention

The invention relates to the technology of alcohol recovery from aqueous fermentate and provides for an energy efficient separation of the alcoholic component thereof. The process operates under reduced pressure to enrich the final product to yield up to 195 proof (97.5 volume percent) ethyl alcohol.

2. Disclosure Statement

U.S. Pat. No. 2,389,789, issued Nov. 27, 1945, to A. Latham, Jr., discloses a distillation method utilizing the sensible heat derived from an internal combustion engine for preheating fresh solution fed to the vaporization zone of an evaporator. U.S. Pat. No. 2,643,974, issued June 30, 1953, to A. M. Impagliazzo, discloses a device for using waste heat from either the lubricating oil or water jacket of a diesel engine or any other heat engine having a recirculating coolant or lubricant, and uses the heat for evaporation of water. A. Plaek, in U.S. Pat. No. 2,400,370, issued May 14, 1946, discloses separation of alcoholic components from a fermented mash including ethyl alcohol and water, where waste heat is recovered with use plural heat exchangers. L. T. Hendrix, in U.S. Pat. No. 3,388,046, issued June 11, 1968, discloses heat recovery in distillation apparatus.

Vapor recompression is disclosed in the publication *Unit Operations of Chemical Engineering*, Third Edition, McCabe and Smith, McGraw-Hill, 1976. A heat pump distillation system is disclosed in *Chemical Engineering Progress*, November, 1977, page 79. Vapor-liquid equilibrium data for the ethanol-water system are disclosed in *Distillation Equilibrium Data*, J. C. Chu, Reinhold Publishing Corporation, 1950, page 90.

Other patents relating to the field of the invention include the following:

U.S. Pat. No. 2,276,089—Mar. 10, 1942—Ragatz
U.S. Pat. No. 3,455,791—July 15, 1969—Nash et al.

SUMMARY OF THE INVENTION

The invention provides a method for producing a high purity ethanol product from an aqueous fermentate without requiring use of a third component such as benzene, without requiring more than one fractionation tower, and making use of waste heat to reduce the energy consumption required for distillation.

Accordingly, a principal object of the invention is to provide a method and apparatus for vacuum evaporation of ethanol from a fermentate, recompressing the evaporated vapors with a compressor powered by an internal combustion engine, passing the condensate to a fractionation tower operated by waste heat from the compressor, removing and recompressing the vapors with a second compressor to give a final product of high purity ethyl alcohol.

Another object of the invention is to produce a high purity ethyl alcohol product from an aqueous system without use of benzene to form a three component azeotrope.

Still another object is to provide a method and apparatus for producing high purity ethyl alcohol from a single fractionation tower.

Yet another object is to produce high purity alcohol without need for dehydration equipment, or to reduce the size and complexity of dehydration equipment needed to produce the desired high degree of purity.

A further object is to provide for vapor recompression utilizing an internal combustion engine to drive the compressor.

Another further object is to recover waste heat of coolant and exhaust gas from the internal combustion engine for use in operating the process.

Still another further object is to utilize waste heat for drying of meal resulting from separation and pressing suspended solid material withdrawn from the fermentate during the evaporation stage of the process.

Yet another further object is to combine the compressor from the evaporation stage and the compressor from the fractionation stage to be driven from a single shaft operated by a single internal combustion engine.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

It is known that the energy in the vapor evolved from a boiling solution can be recovered for vaporizing further liquid, such as occurs in a multiple-effect evaporator where a series of evaporators operates at progressively lower absolute pressures. Alternatively, by increasing the pressure on the evolved vapor by mechanical or thermal recompression, the condensing temperature is increased and the compressed vapor condenses in the evaporator or fractionating tower from which it came. The principle of mechanical vapor recompression on which the present invention relies is described in the McCabe reference cited hereinabove. As is disclosed therein, the energy utilization of such a system is very good. Applicant has used the principles therein outlined for the purpose of producing a high quality ethanol product suitable for fuel or other applications without the necessity of elaborate dehydration equipment, or even with elimination completely of subsequent dehydration steps. With the combination of vapor recompression and fractionation equipment, where the recompression compressor is driven by an internal combustion engine, the fermentate from a conventional fermentation tank utilizing grain can be converted into a high purity ethanol product by recovery of the energy content of the internal combustion engine coolant and the internal combustion engine exhaust. The invention accordingly offers the prospect of energy efficient production of ethanol in bulk quantities as a partial or complete replacement for petroleum derived fuels, and accordingly represents an economical process for deriving fuel from a renewable source of energy, namely, grain, waste cellulosic materials, farm wastes, and other fermentable organic materials, preferably from grain. Because the disclosed system recovers waste heat generated by the internal combustion engine, it can be operated continuously with minimum or no external energy input, and accordingly highly profitably, with the additional possibility of using a portion of the alcohol output as the fuel to power the internal combustion engine or engines driving the compressors. In addition, solids separated during the evaporation stage can be evaporated with excess waste heat to produce a valuable economic commodity saleable as meal having a value which at current commodity price levels and under conventional conditions of fermentation could be sufficient to recover the entire cost of grain used as a raw material.

Figure 1:
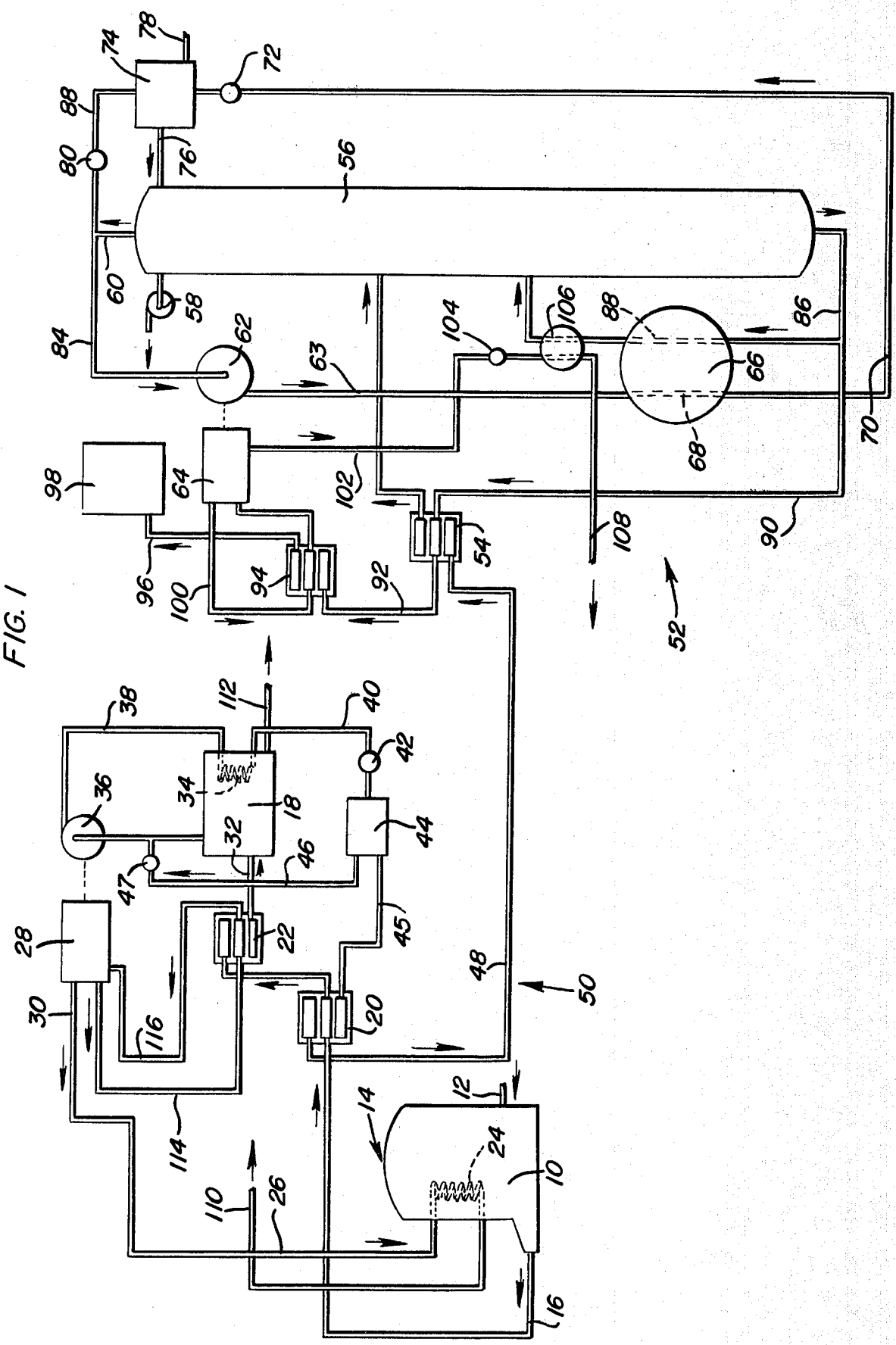
FIG. 1 is a schematic view of a first form of the invention, with arrows indicating the direction of flow of fluids therein, and dotted lines indicating a mechanical linkage.

In FIG. 1, grain and conventional fermentation make-up liquid enter fermentation tank 10 through inlet line 12 and hopper 14. When fermentation is complete, the fermentate, which typically contains about 7% ethanol by volume, passes through line 16 to evaporator 18, passing through heat exchangers 20 and 22 between tank 10 and evaporator 18. Fermentation within tank 10 is produced by high temperature saccharification, taking place at about 180° F. The required temperature in tank 10 is maintained by heat exchange through coil 24, which is heated by exhaust entering through line 26, the exhaust being generated by internal combustion engine 28, the exhaust leaving through exhaust line 30. Warmed fermentate from heat exchanger 22 enters evaporator 18 through line 32, and heat entering through evaporator coil 34 causes formation of vapors in evaporator 18 which pass from evaporator 18 to compressor 36. Compressor 36 is driven by internal combustion engine 28, and compresses the vapors enriched in ethanol. During mechanical compression, vapors in line 38 are compressed to the extent necessary to raise the saturation temperature of compressed vapor above the boiling point of feed, and accordingly heat is introduced through coil 34 into liquid contained in evaporator 18, and condensation occurs inside coil 34. Accordingly, condensed liquid exits through line 40 and passes through expansion valve 42 before entering flash tank 44. Vapors drawn from flash tank 44 are then fed through line 46 through control valve 47 into compressor 36 for recycling. The liquid product from flash tank 44 passes through line 45 to heat exchanger 20, where fermentate entering from line 16 is warmed and evaporated product at a temperature of approximately 180° F., in line 45 is cooled to about 100° F. and exits into line 48. The fluid product flowing through line 48 constitutes the final product from the evaporation stage of the process illustrated in FIG. 1, the components of the evaporation stage being designated generally by numeral 50. The fluid in line 48 further constitutes the starting material for the fractionation stage of the components of the fractionation stage being designated generally by the numeral 52 in FIG. 1.

Liquid in line 48 entering the fractionation stage 52 passes through heat exchanger 54 and is heated to the desired entrance temperature for entrance into fractionation tower 56. Fractionation tower 56 is operated under reduced pressure maintained at the desired level by operation of valved vacuum pump 58. Vapors from tower 56 are withdrawn through line 60 and pass to compressor 62, which is driven by an internal combustion engine 64. Although separate engines 28 and 64 are shown in FIG. 1 for driving each of compressors 36 and 62 in the respective evaporator stage and fractionation stage, a single engine can be alternatively used to drive each of compressors 36 and 62 from a single shaft.

Recompressed vapors from compressor 62 enter line 63 and pass to reboiler 66. Condensation of the pressurized vapors occurs in reboiler 66 in the heat exchange portion shown in phantom as line 68. Liquid then emerges from reboiler 66 through line 70 passing through expansion valve 72 and into flash tank 74. Liquid from flash tank 74 is returned through line 76 to fractionation tower 56 for refluxing, while the product enriched in alcohol passes out from flash tank 74 through line 78. Control valve 80 permits withdrawal of vapors from flash tank 74 through line 82, allowing such vapors to merge with vapors withdrawn from tower 56 through line 60 and be introduced through line 84 into compressor 62 for recompression and recycling through line 63. Bottom product is withdrawn from fractionation tower through line 86, passing in part through line 88 in reboiler 66 for return to tower 56, and passing in part through line 90 to heat exchanger 54, thence through line 92 through heat exchanger 94, and then through line 96 into storage tank 98 for holding for reuse by recycling. Hot water emerging from line 90 and travelling through heat exchanger 54 warms the incoming liquid in line 48 to the proper temperature for entering fractionation tower 56 and gives up a portion of its sensible heat thereby. The water in line 92 is in turn warmed by coolant from engine 64 passing through line 100. Exhaust from engine 64 passes out exhaust line 102, passing through control valve 104 and then through heat exchanger 106. Control valve 104 regulates the thermal input through heat exchanger 106 so that recycled bottom product from line 88 enters tower 56 at the proper temperature. Exhaust emerging from pipe 108, as well as exhaust emerging from pipe 110 in the evaporator section, can be used to assist in start-up, for drying separated meal obtained as bottom product through line 112 of evaporator 18, or for other purposes. Preferably, heat exchanger 22 in the evaporator section is connected by coolant lines 114 and 116 to the coolant system of engine 28. Dehydration towers (not shown) can be added to the system of FIG. 1, such towers preferably also being operated by the heat pump method. However, dehydration should be unnecessary to produce a nearly pure ethanol product, since the vacuum distillation conditions under which tower 56 is operated give a nearly pure product from line 78. In starting the system of FIG. 1, exhaust from engine 28 can assist in starting operation. Further, exhaust from line 108 can be used to assist in start-up. After the system is placed in continuous operation, the energy requirements for evaporation and fractionation can be met entirely from recovered and engine heat, so that no external source of heat is necessary.

Figure 2:
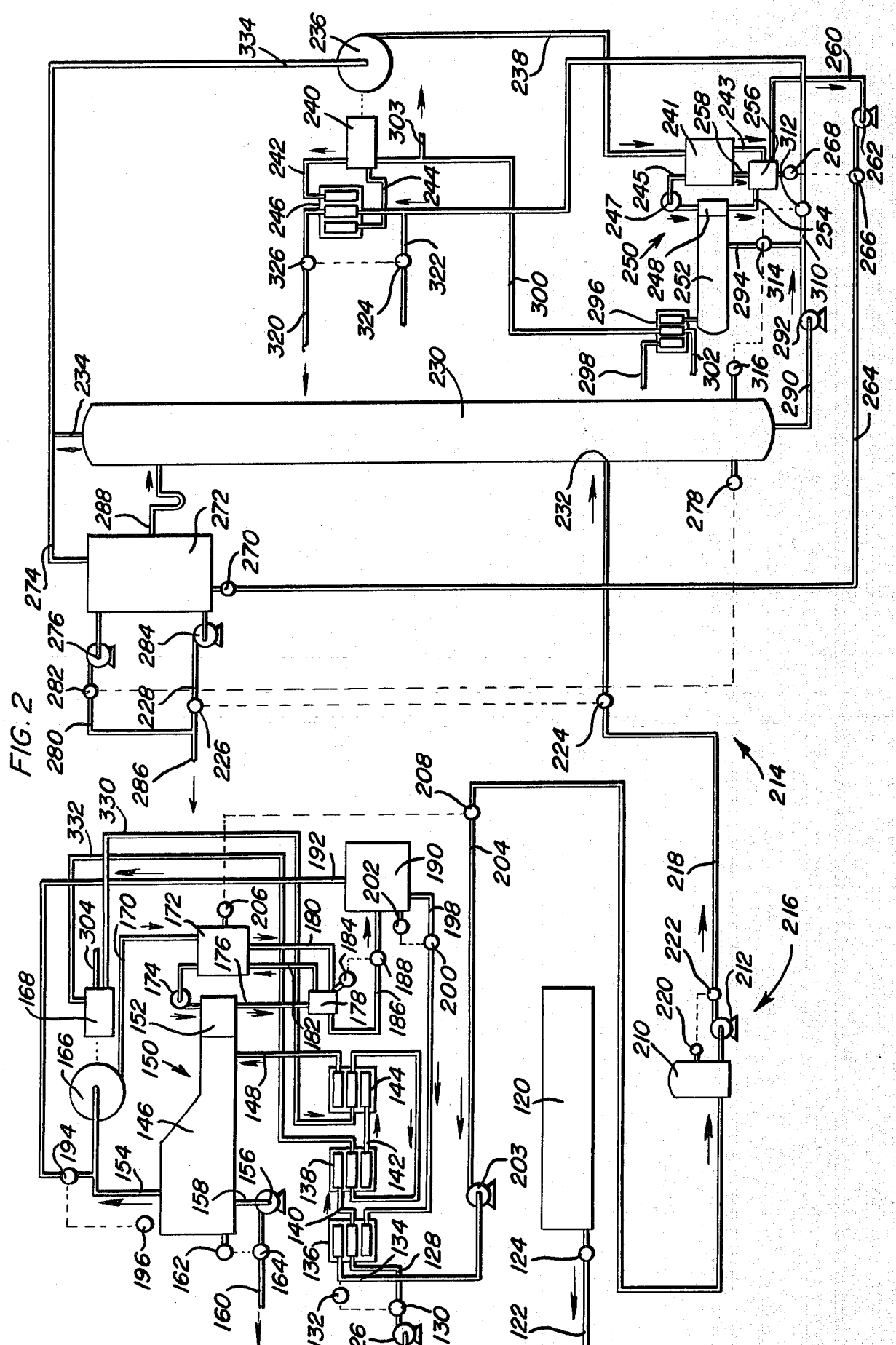
FIG. 2 is a schematic view of a second form of the invention, with arrows indicating the direction of fluid flow and dotted lines indicating mechanical linkage or process control lines, as will hereinafter become apparent.

In a second form of the invention, shown in FIG. 2, fermentation proceeds in batch tank 120, which can be a plurality of batch tanks instead of the single tank 120 shown in FIG. 2. In an arrangement of batch tanks connected in parallel to line 122, valves, such as valve 124, can be used to permit the contents of one tank of the plurality to be discharged into line 122 while other tanks are proceeding with fermentation. Liquid from line 122 is pumped by pump 126 into line 128, responsive to control valve 130, which is controlled by flow control device 132, which measures the temperature of liquid in line 134 and regulates the flow in line 128 accordingly. Entering liquid is warmed in heat exchanger 136, and enters heat exchanger 138 through line 140. Liquid then passes through line 142 through heat exchanger 144, and then into the shell side 146 of the evaporator 150. Liquid entering from line 148, having a content of ethanol of about 7% by weight, as is typically produced by fermentation in tank 120, is warmed by transfer of heat from tube side 152 of heat exchanger 150. At a temperature of approximately 180° F., liquid entering shell side 146 of evaporator 150 is in part vaporized, leaving through line 154, and a suspension of residual solid material is withdrawn by pump 156 through line 158 and discharged through line 160 for production of meal. Level control device 162 regulates the rate of withdrawal of suspension through line 160 by means of control valve 164. Vapors withdrawn through line 154, which are typically somewhat enriched in ethanol to the extent of about 10% by weight, pass to compressor 166 for recompression. Internal combustion engine 168 drives compressor 166, which discharges compressed vapors into line 170 for temporary storage in buffer tank 172. Vapors pass through blower 174 into the tube side 152 of evaporator 150 for condensation through heat transfer to shell side 146 of evaporator 150. Liquid emerges from tube side 152 through line 176, passing to trap 178, which also receives condensate from buffer tank 172 by way of line 180. Return of vapors through line 182 to buffer tank 172 permits any uncondensed vapors in trap 178 to be recycled through blower 174. Level control device 184 regulates the flow out of trap 178 through line 186 by means of control valve 188. Liquid passing through control valve 188 enters flash tank 190, which lowers the pressure on liquid entering by means of an expansion valve (not shown). Vaporization of a portion of the incoming material occurs, the vapors passing through line 192 back to compressor 166. Control of the flow of vapors through line 192 is effected by control valve 194, responsive to the pressure measured by pressure control device 196 attached to the shell side 146 of heat exchanger 150. Liquid from flash tank 190 passes through line 198, the flow of which is regulated by control valve 200, responsive to the level of liquid in flash tank 190, as measured by level control device 202. Liquid flowing through control valve 200 enters heat exchanger 136 at a temperature of about 180° F. and emerges through line 134 at a temperature of about 100° F., having warmed liquid entering heat exchanger 136 from line 128 at about 90° F., to a temperature of about 150° F. in line 140. Liquid from line 134 is pumped by pump 203 through line 204, responsive to the pressure measured at buffer tank 172 by pressure control device 206 and connected to control valve 208. Liquid at about 100° F. is then stored in buffer tank 210 for conveying by pump 212 to the fractionation stage.

The fractionation stage of the form of the invention shown in FIG. 2 is designated generally by the numeral 214, while the evaporation stage is designated generally by the numeral 216. Liquid pumped through line 218 by pump 212 is controlled by level control device 220 attached to buffer tank 210, the level control device 220 controlling the flow through control valve 222. Flow through line 218 is measured by flow control 224, in order to regulate the output through control valve 226 in discharge of product from line 228. Incoming liquid enters fractionation tower 230 at inlet 232, and the volatile components of water and ethanol undergo separation under reduced pressure of about 95 mm Hg. Vapors withdrawn from the top of tower 230 through line 234 pass to compressor 236 for recompression and discharge into line 238. Compressor 236 is driven by internal combustion engine 240, which circulates coolant through coolant lines 242 and 244 through heat exchanger 246. Recompressed vapors in line 238 pass into buffer tank 241 for separation of condensate through line 243 from vapors, which pass through line 245 through blower 247 and into the tube side 248 of heat exchanger 250. Heat is transferred from tube side 248 of heat exchanger 250 to shell side 252 of heat exchanger 250. Condensed liquid product from tube side 248 of heat exchanger 250 passes through line 254 into trap 256, which also receives condensate through line 243 from buffer tank 241. Vapor separated from trap 256 passes through line 258 into buffer tank 241 for recycling. Liquid product from trap 256 passes through line 260 and is pumped by pump 262 into line 264, subject to control by control valve 266, responsive to level control device 268, which measures the liquid level in trap 256. Liquid from line 264 passes through expansion valve 270 into flash tank 272 where vapors and liquid are formed, the vapors passing through line 274 for recycling to compressor 236. Vacuum pump 276 maintains the pressure in flash tank 272 and tower 230 at the desired level, responsive to temperature control device 278, discharging product through line 280 responsive to control valve 282 connected to temperature control device 278. Further, liquid product is discharged from flash tank 272 through pump 284 into line 228, emerging at discharge port 286. A portion of liquid from flash tank 272 can be returned to tower 230 through trapped line 288. The bottom product from tower 230 passes through line 290 under pumping from pump 292, a portion thereof passing through line 294 for recycling through the shell side 252 of reboiler 250. After being warmed in heat exchanger 296, the liquid then returns through line 298 to tower 230. Heating of liquid at heat exchanger 296 occurs by heat transfer from exhaust gas from engine 240 in exhaust line 300. Exhaust gas emerging through orifices 302 and 303 can be used for drying meal produced at line 160, along with exhaust gas from line 304 of engine 168. A portion of liquid pumped by pump 292 from line 290 containing bottom product from tower 230 passes through line 294 as described above, and another portion passes through line 310. The relative flows through lines 310 and 294 is determined by control valves 312 and 314, the operation of which is regulated by level control device 316 responsive to liquid level in tower 230. Liquid from line 310, which is substantially pure water with a minimum amount of ethanol contained therein, passes into heat exchanger 246 for warming to about a temperature of 180° F., this heated water passing through line 320 for the purpose of starting high temperature saccharification in an early stage of the process. Other bottom product of substantially pure water passes through line 322 at a temperature of about 125° F., and is used to start fermentation by mixing with make-up water at about 55° F., to yield a good fermentation temperature range of about 90° F. to 100° F. Flow through line 322 is regulated by control valve 324, responsive to temperature control device 326 in line 320.

While the invention is not limited to particular process parameters herein described except to the extent defined in the claims, typical temperatures are given herein by way of example for the particular arrangement shown in FIG. 2. Fermentation in batch tank 120 preferably proceeds at about 90° F. to 100° F., yielding a product of about 7% by weight of ethanol, as well as suspended solids, which enter evaporator 150 through line 148. In the shell side 146 of evaporator 150, these materials are evaporated at a temperature of about 180° F., yielding a vapor through line 154 enriched to about 10% ethanol and free of solids. A suspension of solid matter is drawn from shell side 146 of evaporator 150 through line 158 and discharged through line 160 for production of meal by evaporation as disclosed hereinabove. Trap 178, while performing the function of recycling of vapors as disclosed above, further serves to remove carbon dioxide gas generated during the fermentation process. Liquid at about 195° F. passes through line 186 to flash tank 190, where the pressure is lowered in the manner described above. Liquid is removed at line 198 at a temperature of about 180° F., entering heat exchanger 136 and being cooled to about 100° F. in line 134, while warming incoming liquid in line 128 at about 90° F. to a temperature of about 150° F. in line 140. Liquid from line 140 is then warmed in successive heat exchangers 138 and 144, serially connected to the coolant lines 330 and 332 of engine 168. In heat exchanger 138, liquid from line 140 at a temperature of about 150° F., is warmed to about 175° F. in line 142, and then to about 180° F., in line 148. Liquid emerging from heat exchanger 136 and line 134 at 100° F. is stored in buffer tank 210 at about 100° F., which can be arranged in a manner not shown to blow vapors from the tube side 152 of evaporator 150 through the entire system if necessary. However, such a feature is optional and not necessary for successful operation of the system. Liquid enters tower 230 at orifice 232 at about 100° F. Compressor 236 preferably recompresses vapors from line 334 at a pressure of about ⅛ atmosphere to a pressure of about ⅜ atmosphere in line 238, and most preferably at a compression ratio of about 3.5. The temperature of bottom product removed from tower 230 at line 290 is about 125° F. while the temperature of vapors removed at line 234 is about 100° F., when tower 230 is operated at a pressure of about 95 mm Hg.

EXAMPLE

The arrangement of FIG. 2 is operated to produce a final output of substantially pure ethanol at a rate of one gallon per minute (6.6 lb/min). It is assumed that fermentate from batch tank 120 is introduced as needed to produce such a final flow rate, and that the ethanol content of the liquid introduced is about 7 weight percent. It is further assumed that the mechanical efficiency of engines 168 and 240 is 30%, and that vapors evolved in evaporator 150 contain 10 weight percent ethanol. Vapors are compressed by a pressure ratio between line 154 and line 170 of about 1.4, and vapors are compressed in the fractionation stage between line 334 and line 238 by compressor 236 with a pressure ratio of about 3.5. The temperature of vapors in line 154 is about 180° F., and the temperature in line 334 is about 100° F.

By making use of well-known relationships for calculating the energy required to compress a given volume of gas, supplying constants to the appropriate equations where necessary, it is readily apparent to one skilled in the art that under the assumed conditions, 66 lb. of 10 weight percent ethanol is vaporized per minute in shell side 146 of evaporator 150, comprising 59.4 lb. water and 6.6 lb. ethanol. The water amounts to 3.3 lb.-moles and the ethanol constitutes 0.14 lb.-moles, totalling 3.44 moles/min. By multiplying the appropriate constant by the volume occupied by one mole of gas at 180° F., and further multiplying the natural logarithm of the pressure ratio of 1.4, the mechanical power required is 35 horsepower rounded to the nearest unit. This represents the mechanical energy required to operate compressor 166 in evaporation stage 216 and relating this power requirement to the fuel requirement for engine 168, after dividing by the assumed engine mechanical efficiency of 30%, gives a value of 4950 BTU to operate engine 168 per minute, of which 70% represents waste heat.

For the distillation stage, only a portion of the throughput of line 334 is represented by flow of top product from tower 230 through line 234. Assuming a reflux ratio of 8 to 1 and the pressure ratio over compressor 236 of 3.5, a similar calculation gives a total flow through compressor 236 of 1.29 lb-moles/min. This requires a power input of 43 horsepower to carry out the mechanical recompression from line 334 to line 238. Again, assuming 30% mechanical efficiency for engine 240, the energy requirement for the fractionation stage is 6080 BTU/gal, of which 70% or about 4755 BTU/gal. is available for utilization in heat exchanger 246, heat exchanger 296, for drying of meal, or other purposes. Similarly, since 70% of the energy needed to operate engine 168 in the evaporation stage 216 is evolved in the form of waste heat through coolant lines 330 and 332 and exhaust line 304, this heat is available for various purposes, such as preheating feed in heat exchangers 138 and 144 and drying meal. Inasmuch as the waste heat from engine 168 is approximately double the preheating energy requirements for incoming fluid from line 140, sufficient excess energy is available from the evaporator stage engine 168 to operate evaporator 150. Further, the waste heat from engine 240 in the fractionation stage is sufficient to heat the bottom product of tower 230 to the desired temperature to start successive batches. Exhaust from engine 240 can be used to dry meal, which is removed from the bottom of evaporator 150, pressed and dried.

Accordingly, the over-all energy balance is 11,030 BTU/gal of ethanol product per minute, representing the sum of the evaporator stage and fractionation stage values of 4255 BTU/gal and 6775 BTU/gal, respectively. Minimal pumping and vacuum pump power requirements, estimated at 4 horse power are excluded from this calculation. Further, certain compressor inefficiencies and other inefficiencies require certain additional increments of waste heat, suggesting a total thermal balance of 14,000 to 16,000 BTU/gal of ethanol produced each minute. Inasmuch as a gallon of the ethanol of the quality produced by the invention generates approximately 85,000 BTU, it is possible to run engines 240 and 168, if adapted for operation on ethanol, by burning approximately 1/6 of the ethanol product output. Further, the cost of dried meal produced at current price levels can cover the cost of grain required in fermentation tank 120.

The distillation equipment of the Chu reference clearly shows that at 95 mm Hg, no azeotrope exists prior to 98.25 mole percent ethanol. For reference purposes, 92 mole percent ethanol is nearly equivalent to 97.5 volume percent ethanol. It is evident from the McCabe et al reference that mechanical recompression can yield the equivalent of about 10 to 15 effects.

Inasmuch as conventional processes for separation of ethanol by distillation require in excess of 100,000

BTU/gal of ethanol produced, the Example demonstrates that the present process represents a substantial energy savings, resulting from the use of an internal combustion engine to both drive a compressor for recompression and to generate waste heat used to operate the components of the system.

Throughout the specification and claims, unless otherwise specified, parts and proportions are expressed in weight percent, and temperatures are expressed in degrees Fahrenheit.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A process for the separation and recovery of ethanol from an aqueous fermentate consisting essentially of about 7% by weight ethanol, a minor portion of suspended solid matter, with the balance of the fermentate being water, the process comprising the following steps:
    (a) pumping the fermentate to an evaporator within which separation and discharge of said solid matter from evaporator vapors of ethanol and water occurs;
    (b) recompressing said evaporator vapors by a first compressor and condensing the compressed vapors;
    (c) passing the condensate formed from the compressed vapors to a fractionation stage and fractionating said condensate under reduced pressure fractionation into vapors rich in ethanol and liquid bottom product rich in water;
    (d) withdrawing the vapors and withdrawing the bottom product;
    (e) recompressing said vapors rich in ethanol in a second compressor and condensing the vapors to form a liquid product rich in ethanol;
    (f) withdrawing said liquid product containing at least about 97 volume percent ethanol;
    (g) driving each of said first and second compressors by an engine, said engine producing recoverable waste heat; and
    (h) using at least a portion of said recoverable waste heat for heating said fermentate, said bottom product, or said discharged solid matter.

2. The process of claim 1 wherein said evaporator includes a tube side and a shell side, said fermentate being pumped from a batch tank to the shell side of said evaporator and condensing the compressed vapors formed in said first compressor by countercurrent flow through the tube side of said evaporator.

3. The process of claim 2 wherein said first and second compressors are driven by an internal combustion engine.

4. The process of claim 3 wherein said first compressor is driven by a first internal combustion engine and second compressor is driven by a second internal combustion engine.

5. The process of claim 4 wherein said first engine produces waste heat, utilizing said waste heat for preheating said fermentate from said batch tank and drying said separated and discharged solid matter to form meal.

6. The process of claim 5 wherein said second engine produces waste heat, utilizing said waste heat for heating a portion of said bottom product rich in water for use in starting high temperature saccarification, further utilizing said waste heat for further heating said bottom product heated in the shell side of said reboiler, further fractionating said reheated bottom product.

7. The process of claim 6 wherein said condensate is passed in heat exchange relationship with said fermentate as said fermentate is being pumped from said batch tank to said evaporator for preheating said fermentate, thereafter passing said condensate to said fractionation.

8. The process of claim 1 wherein condensing said vapors rich in ethanol to form a liquid product rich in ethanol includes the step of passing said recompressed vapors rich in ethanol into the tube side of a reboiler having a tube side and a shell side, whereby said vapors condense within said tube side, the process further comprising passing a portion of said bottom product rich in water through the shell side of said reboiler whereby said liquid bottom product is reheated and recycled for fractionation.

9. The process of claim 8 wherein fractionating said condensate further comprises recycling a portion of the condensed vapors rich in ethanol condensed in the tube side of said reboiler for further fractionation.

10. The process of claim 9 wherein said recycled portion of the condensed vapors is passed through an expansion valve and into a flash tank, whereby partial evaporation in said flash tank produces reflux vapors and reflux liquid, a portion of said reflux liquid being passed for further fractionation, said refluxed vapors being passed to said second compressor for recompressing, a portion of said reflux liquid formed in said flash tank being withdrawn from said flash tank as said liquid product, said process further including pumping with a vacuum pump the contents of said flash tank.

11. The process of claim 10 wherein said vacuum pump maintains said flash tank and reduced pressure fractionation at a pressure of about 95 mm Hg.

12. The process of claim 1 wherein said first compressor is driven by a first internal combustion engine and said second compressor is driven by a second internal combustion engine, wherein the pressure ratio over said first compressor is about 1.4 and the pressure ratio over said second compressor is about 3.5, said evaporator vapors being evolved from said evaporator and recompressed by said first compressor a temperature of about 180° F., said separated vapors rich in ethanol being recompressed by said second compressor a temperature of about 100° F., said fractionating further comprising the step of refluxing a portion of said liquid product, the refluxed portion being passed for recycling for further fractionation, the ratio of the volume of said refluxed portion to said withdrawn liquid product is about 8, said liquid product being separated into a recovered portion and a fuel portion, the fuel portion being used to operate the internal combustion engines, the ratio of recovered portion to fuel portion being about 5.

13. A process for the separation and recovery of ethanol from an aqueous fermentate comprising a liquid mixture consisting essentially of ethanol in water and a minor portion of suspended solid matter, the process comprising; separating and discharging said solid matter from said mixture in an evaporator, producing evaporator vapors during separation of said solid matter, recompressing said evaporator vapors by means of a compressor and condensing the compressed vapors, fractionating said liquid mixture under reduced pressure fractionation into vapors rich in ethanol and liquid bottom product rich in water, recompressing said vapors rich in ethanol in a compressor and condensing the vapors to form a liquid product rich in ethanol, withdrawing said liquid product containing at least about 97 volume percent ethanol, driving each of said compressors by an engine, said engine producing recoverable waste heat, and using at least a portion of said recoverable waste heat for heating said fermentate or said discharged solid matter.

14. A process for separation and recovery of ethanol from a fermentate comprising a liquid mixture consisting essentially of ethanol in water and a minor portion of suspended solid matter, the process comprising: passing said liquid mixture to a fractionation stage and fractionating said mixture under reduced pressure fractionation into vapors rich in ethanol and a liquid bottom product rich in water, withdrawing the vapors and withdrawing the bottom product, recompressing said vapors rich in ethanol in a compressor, condensing the vapors to form a liquid product rich in ethanol, withdrawing said liquid product containing at least about 97 volume percent ethanol, driving said compressor by an engine, said engine producing recoverable waste heat, and using at least a portion of said recoverable waste heat for heating said fermentate or said bottom product.

* * * * *